(No Model.) 10 Sheets—Sheet 1.

J. HINSTIN.
HEATING APPARATUS.

No. 529,072. Patented Nov. 13, 1894.

Witnesses
W. R. Edelen
Reeve Lewis

Inventor.
Joseph Hinstin
by Clifford Mauro
his attorneys.

(No Model.) 10 Sheets—Sheet 2.
J. HINSTIN.
HEATING APPARATUS.

No. 529,072. Patented Nov. 13, 1894.

Witnesses: W. R. Edelen, [signature]

Inventor: Joseph Hinstin by Pollok and Mauro, his attorneys.

(No Model.) 10 Sheets—Sheet 3.

J. HINSTIN.
HEATING APPARATUS.

No. 529,072. Patented Nov. 13, 1894.

Witnesses.
W. R. Edelen.

Inventor.
Joseph Hinstin
by his attorneys

THE NORRIS PETERS CO., PHOTO-LITHO., WASHINGTON, D. C.

(No Model.) 10 Sheets—Sheet 4.
J. HINSTIN.
HEATING APPARATUS.

No. 529,072. Patented Nov. 13, 1894.

Fig. 6.

(No Model.) 10 Sheets—Sheet 5.
J. HINSTIN.
HEATING APPARATUS.

No. 529,072. Patented Nov. 13, 1894.

Fig. 7.

Witnesses
W. R. Edelen
Reeve Lewis

Inventor.
Joseph Hinstin
by Pollok & Mauro
his attorneys.

(No Model.)  
10 Sheets—Sheet 7.

J. HINSTIN.
HEATING APPARATUS.

No. 529,072.  
Patented Nov. 13, 1894.

Fig. 10.

Witnesses.  
W. R. Edelen.  
Inventor  
Joseph Hinstin  
by his attorneys (No Model.) 10 Sheets—Sheet 8.
J. HINSTIN.
HEATING APPARATUS.

No. 529,072. Patented Nov. 13, 1894.

(No Model.) 10 Sheets—Sheet 10.

J. HINSTIN.
HEATING APPARATUS.

No. 529,072. Patented Nov. 13, 1894.

Witnesses
W. R. Edelen

Inventor
Joseph Hinstin
by Pollok Mauri
his attorney

UNITED STATES PATENT OFFICE.

JOSEPH HINSTIN, OF PARIS, FRANCE.

HEATING APPARATUS.

SPECIFICATION forming part of Letters Patent No. 529,072, dated November 13, 1894.

Application filed April 24, 1894. Serial No. 508,835. (No model.) Patented in France December 29, 1890, No. 210,495, and in England July 8, 1891, No. 11,622.

*To all whom it may concern:*

Be it known that I, JOSEPH HINSTIN, a citizen of the Republic of France, residing at Paris, in said Republic, have invented a new and useful Improvement in Heating Apparatus, (which has been patented in part in France by Patent No. 210,495, dated December 29, 1890, and in Great Britain by Patent No. 11,622, dated July 8, 1891,) which is fully set forth in the following specification.

This invention relates to certain improvements in furnaces or heating apparatus (including industrial furnaces, domestic heaters, fire places, ranges, and locomotive furnaces, &c.) wherein the carbonic oxide and other products of a first combustion are consumed by a second or more complete combustion, as described in Letters Patent No. 468,875, granted to me February 16, 1892.

As set forth in said patent all combustible gases generated from the fuel and all molecules of carbon, the products of incomplete combustion are drawn between two currents of highly heated air to a very hot point in the apparatus where they are compressed between the double current and consumed in the manner of the well known Bunsen burner.

The object of the present invention is to effect the more perfect final combustion, and consequently the production of more intense heat by certain improvements in mechanisms for the admission and regulation of the two drafts or currents of heated air between which the combustible gases are compressed. These two currents are admitted, one above and the other to the rear of the fuel, and follow respectively the line of the arch of the furnace and the fire bridge, meeting at a point on the arch or fire bridge, or the extension of one of them. To accomplish this result the two elements (the arch and fire bridge) or either of them or their extremities are in the plane of the direction of the draft. Both are composed of refractory material and the two layers or currents of air become heated and acquire a high velocity as they pass upon their surfaces. It is evident therefore, that the arch and fire bridge should be prevented from cooling and the quantity of air passing over them regulated. This is accomplished by means of certain partitions and registers of which a more exact description will be given hereinafter in connection with the drawings accompanying this specification.

The improvements which constitute the present invention may be utilized as well in fire places or furnaces having one or two ordinary grates, as in the furnaces described in Letters Patent No. 468,875. For that purpose there are shown different applications of this invention to various forms of fire places, ranges, stoves and furnaces.

Figs. 9, 75 10, 12 and 13 are similar views of different forms of boiler furnaces.

Referring to the drawings, G is the grate upon which the fuel F is placed. When two or more grates are employed G A is the grate of the front foyer or combustion chamber, GF of the middle foyer and G R of the rear foyer. The grates may be of various forms and constructions best suited to the different applications.

VA is the arch of the apparatus over the face of which the draft of air indicated by the dotted line AA, from the front passes. The form of this arch may vary greatly in construction. It is of refractory material and may have corrugations CA (as in Figs. 3 and 5) to form channels for the air above the fuel.

Figure 6:
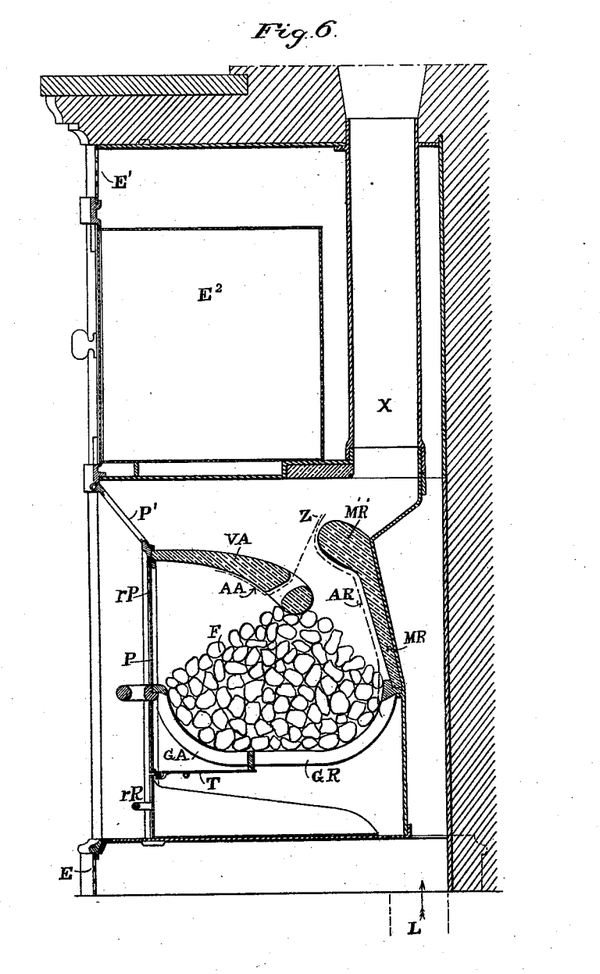
Figure 7:
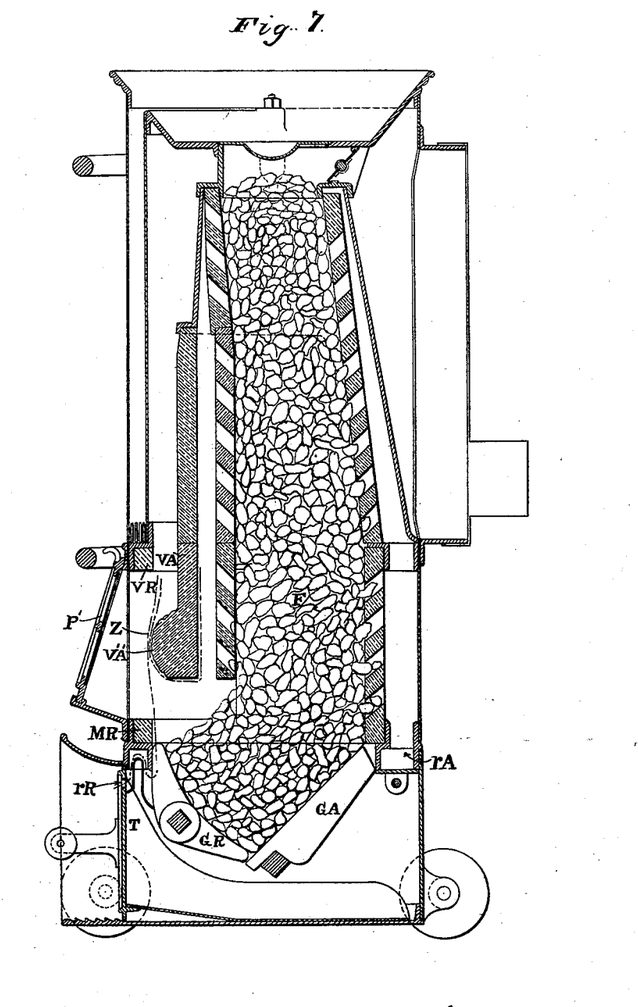
Fig. 7 is a vertical section of a heating stove.
Figure 8:
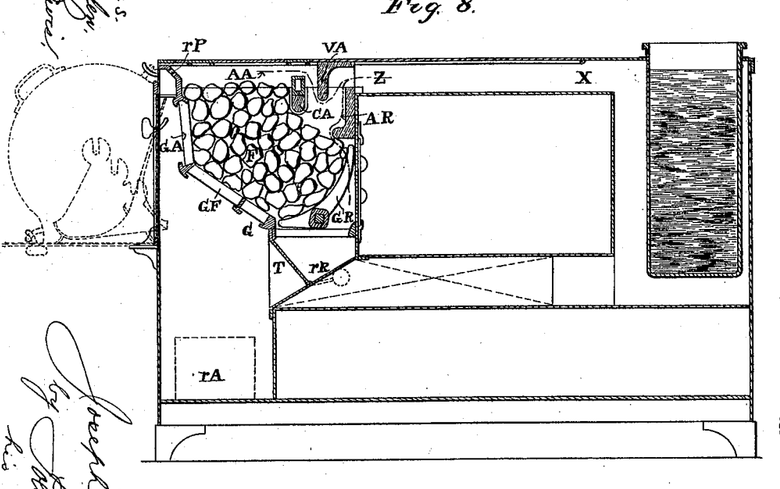
Fig. 8 is a similar view of a cooking range.
Figure 10:
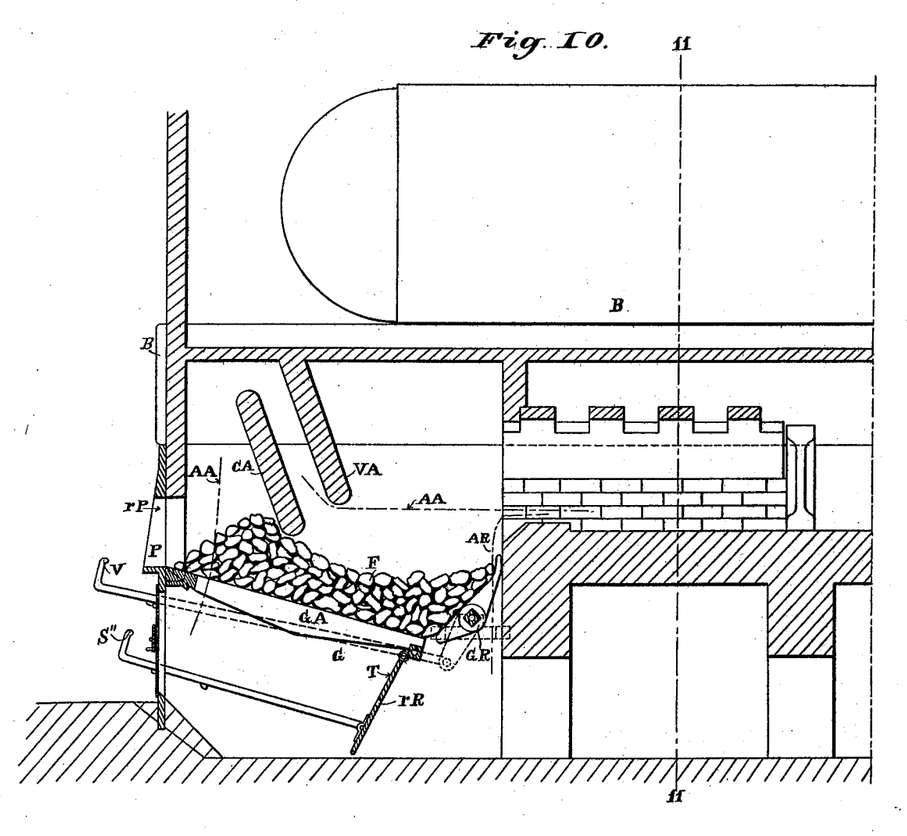
Figure 11:
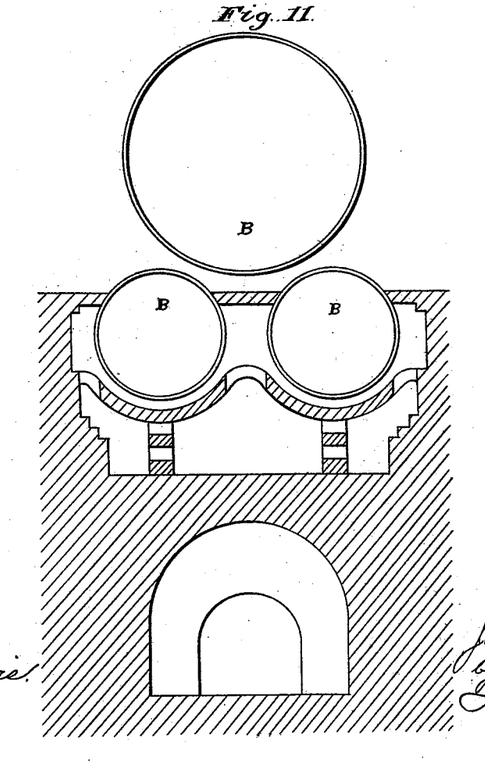
Fig. 11 is a section of the furnace shown in Fig. 10 taken on line 11—11.

Other constructions accomplishing the same result are the perforations in Fig. 6 and the two separate arches in Figs. 8 and 10, the separate arch in these figures being lettered CA. In the domestic heater shown in Fig. 7 the extension of the arch V′ A′ is made to represent a log of wood upon which the combustion of the gases takes place in flame.

The arch is usually situated directly above the fuel and thereby maintained in a highly heated state.

Figure 1:
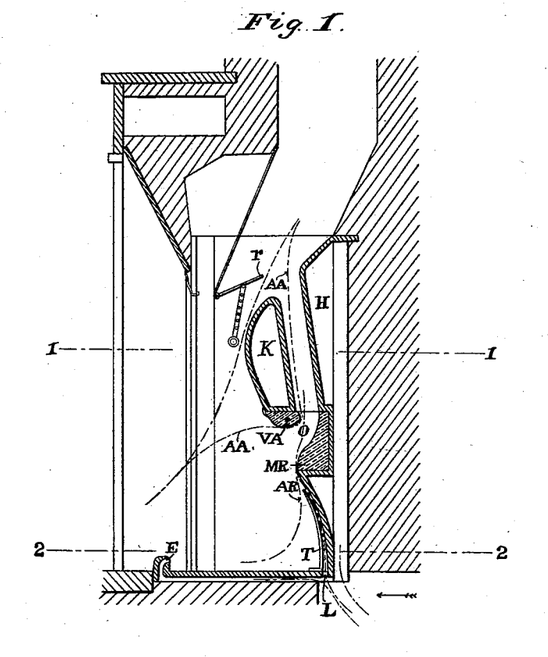
Figure 1 is a vertical section of a fire-place heater, the construction being such as is adopted with and-irons or a portable grate.
Figure 2:
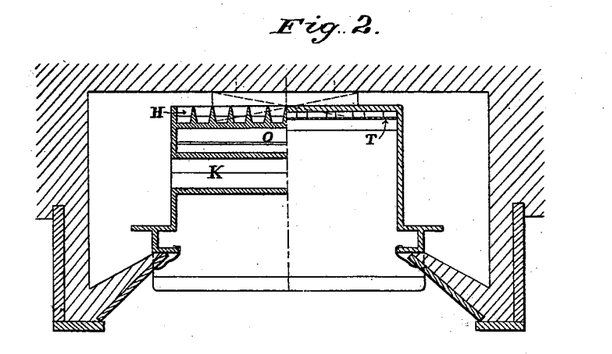
Fig. 2 is a horizontal section of the same, one side being in plane 1—1 and the other in plane 2—2 of Fig. 1.
Figure 5:
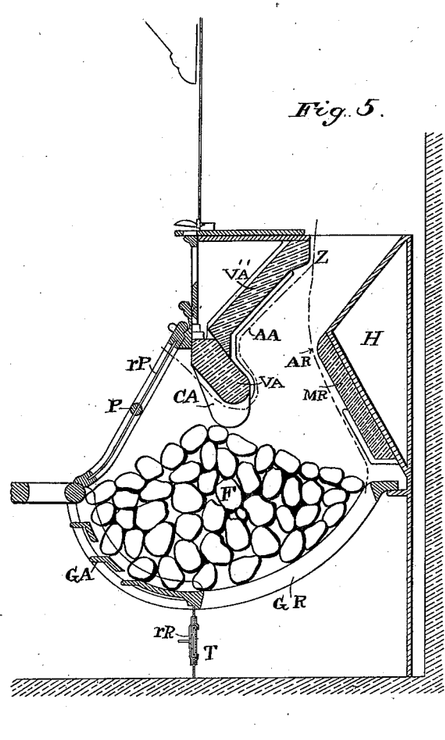
Figs. 5 and 6 are vertical sections of other forms of fire place heaters.

A register rP, often placed in the cover P for the front opening of the apparatus as in Fig. 5, regulates the admission of the air in quantity to be properly heated in contact with the arch. In the case of the open fire place (Figs. 1 and 2) the register is omitted, and the draft regulated by means of a damper r which directs a certain portion of the air into the flue and away from the arch VA.

The fire bridge MR is also of refractory material and may take the various forms described for the arch VA, i.e. with corrugations, &c. This bridge is situated at the end of the apparatus at the rear of the grate and between it and the grate passes the current of air indicated by the dotted line AR. The bridge is kept in a heated state by the heat of the incandescent fuel and it in turn heats the air passing over its surface from beneath the grate.

In order to obtain the best results from the system of combustion described in my said patent and exemplified in the various figures of the annexed drawings, and to carry out in the most perfect manner the theory of this system I have found it desirable and important to introduce into the space beneath the grate a partition T. This partition acts as in Figs. 3, 5 and 6 and others, to separate the space under the forward grate or grates and that beneath the rear grate, so that the latter is to a certain extent independent of the former as to its air supply, which can be directed and controlled in such manner as to accomplish the objects herein indicated.

The main object of the device is to maintain the temperature on the surface of the fire bridge MR at the proper point. The access of air in too great volume, or in unregulated quantities has the effect of lowering the temperature of the fuel at the rear of the grate, and consequently of the fire bridge, in which event the operation of the apparatus would be impaired.

The two currents or layers of air, represented by the dotted lines AA and AR, are admitted, the former above, the latter below the fuel. The point of contact is at Z and at this point the final conversion of the carbonic oxide into carbonic acid and the complete combustion of the products of the first combustion take place in flame. The arch and the fire bridge both extend into the plane or line of one of the drafts and one into the plane of both currents of air. In other words one of the layers or currents AA or AR passes over the surface of both the arch VA and fire bridge MR. Thus in Fig. 3 it is the layer AA that makes contact with both of these elements, while in Fig. 5 it is the layer AR. The two layers meet on the element which extends into the plane of the line of both currents.

After the combustion at the point Z the resulting gases take the direction of the resultant of the convergent directions of the two currents toward the flue X.

When necessary a third element of refractory material VR is placed at the point of the apparatus where the intense heat is liable to impair the metal casing. This dome or guard VR also effects the radiation of the heat.

Having now generally described the invention various applications will be considered, which illustrate the principles applied in fire-places, ranges, domestic stoves, industrial furnaces, locomotive fire boxes, crematory furnaces, &c.

The four apparatus shown in Figs. 1 to 6 inclusive, are fire places of various construction. These apparatus consist of metal casings fitting in the opening for the fire place. The casings are adjusted to the wall in front but on the sides and rear between the wall and the casing are chambers or spaces H, through which air may freely circulate. Air from without is admitted by the opening L and after being heated by radiation in contact with the casing, is permitted to escape into the room by registers placed at any convenient point, as at E' Fig. 6.

In the construction shown in Fig. 6 a warming oven $E^2$ over the fire place is heated by the warm air surrounding it before issuing from the register into the apartment. This apparatus is intended for use in a dining room. Extending from side to side is a tubular portion K of the metal casing (see Figs. 1 and 2) through which also the air from the spaces H may pass freely. Below this portion K is the refractory arch VA protecting it from too rapid deterioration and heating the draft of air from the room AA, as it passes to the opening O. The fire bridge MR also of refractory material is fitted in the casing at the rear of the fire place. These two elements may in this apparatus be formed in one piece with large perforations O for the passage of the gases and air to the flue X.

The metal partition T at the rear of the grate directs the draft AR against the bridge MR. The air for this current enters through the opening L. To aid the drafts and combustion of the fuel an air inlet E at the foot of the fire place in front of the grate admits air from the opening L.

Figure 3:
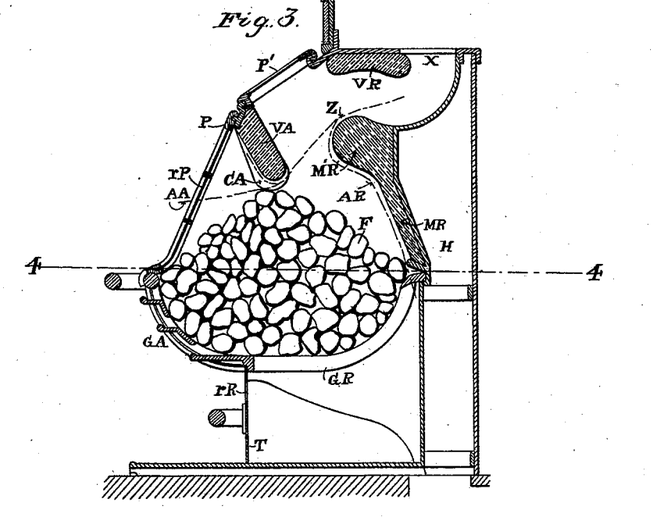
Fig. 3 is a vertical section of another form of fire place heater, and Figure 4:
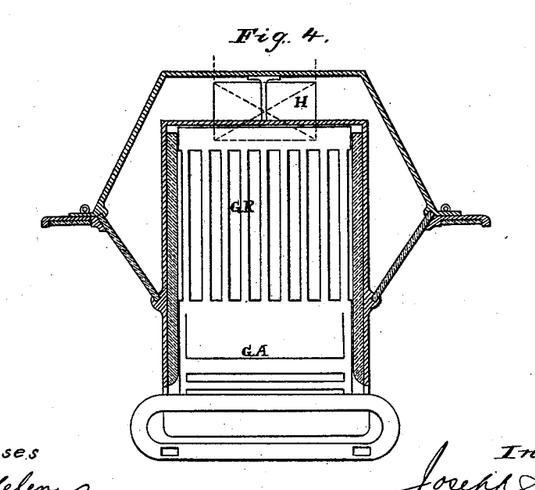
Fig. 4 is a horizontal section on line 4—4 of Fig. 3.

A special construction in Fig. 3 is a transparent covering of mica or other substance for the opening P' through which the flame at Z may be seen burning against the prolongation of the bridge M' R' made to represent a log of wood. In Fig. 6 the partition T extends horizontally from below the grate to the front casing.

A domestic stove for heating an apartment is shown in Fig. 7. Air entering at rA circulates through the fuel as the gas is distilled in the first grate and carries the combustible gases down under the arch VA and over the incandescent coke of the middle and third grates. The air admitted by register r R is directed by the partition T to the extremity of the grate GR adjoining the fire bridge MR. The action of the gases from this point varies but slightly from the operation already described. The arch V' A' is constructed like the fire bridge M' R' in Fig. 3 to resemble a log of wood and is seen through the opening P'.

In Fig. 8 the arch is divided into two portions CA and VA and between them the current AA with the distilled gases passes to the point Z. Air necessary for the drafts enters by the opening rA in the side of the range and is admitted and regulated by the two registers, rR in the partition T for the rear current AR and rP for the current AA.

Figure 9:
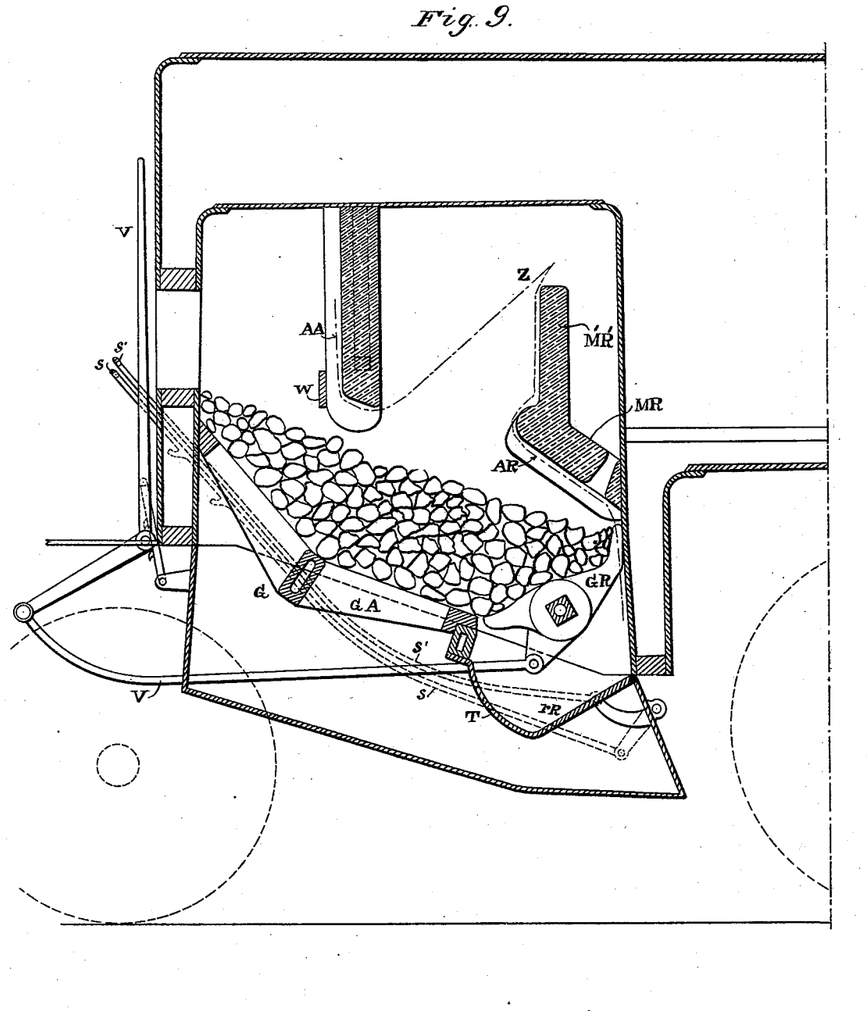

The register rR (in Fig. 9 showing a locomotive fire box), adjoins the partition T and is manipulated by the levers s and s'. The lever V turns the movable grate GR on its axis. As a protection against damage in charging and cleaning the grates, metal strips W may be attached to the front of the corrugations of the arch VA. The extension of the fire bridge M' R' radiates the heat of the flames of the final combustion over as great a space as possible. The boiler or boilers heated by the apparatus are shown at B in Figs. 9 to 13.

The arch in Fig. 10 is divided into two partitions CA and VA and the distilled gases of the first foyer are drawn between them over the incandescent coke of the second and third foyers.

Figure 12:
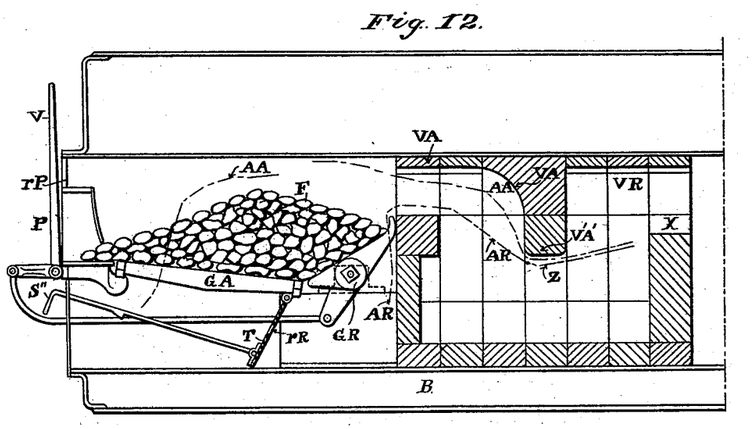
Figure 13:
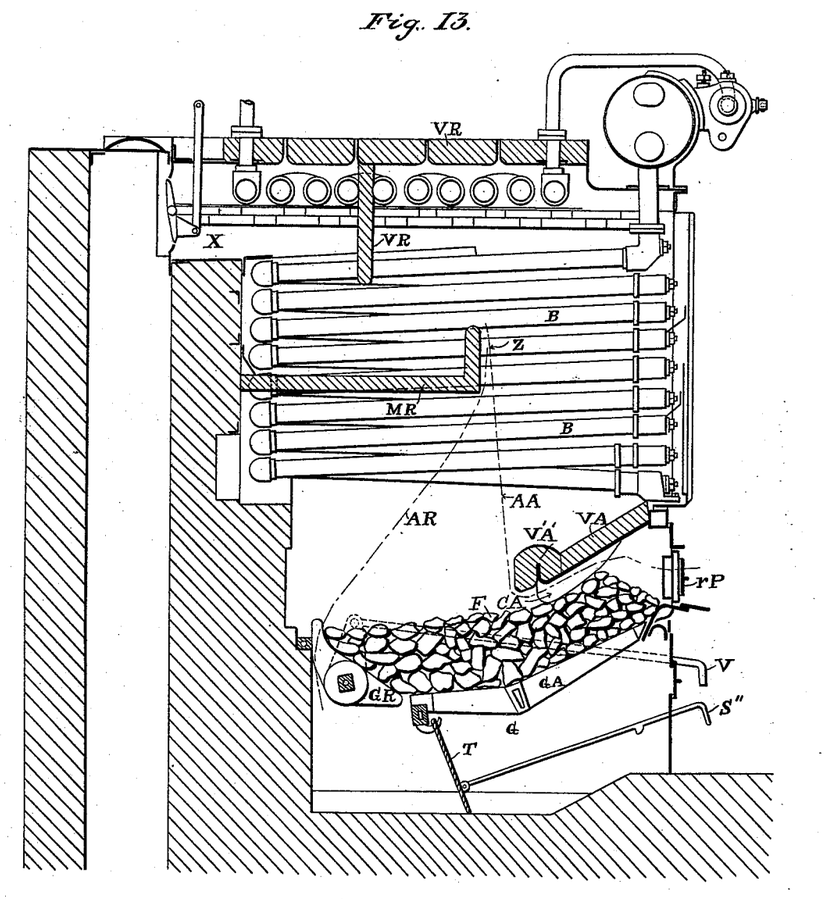

The partition T is movable and may be adjusted by the lever S".

Where the fire box fits within the boiler as in Fig. 12, the arch instead of being above the fuel is arranged at the rear over and beyond the fire bridge. The point of total combustion is on a downward extension of this arch V' A'.

The furnace (Fig. 13) is applied to a multitubular boiler and the fire bridge being prolonged brings the point of final combustion and intense heat Z within the coils. The arch VA and prolongation V' A' are supported by a metal plate provided with corrugations CA.

Figure 14:
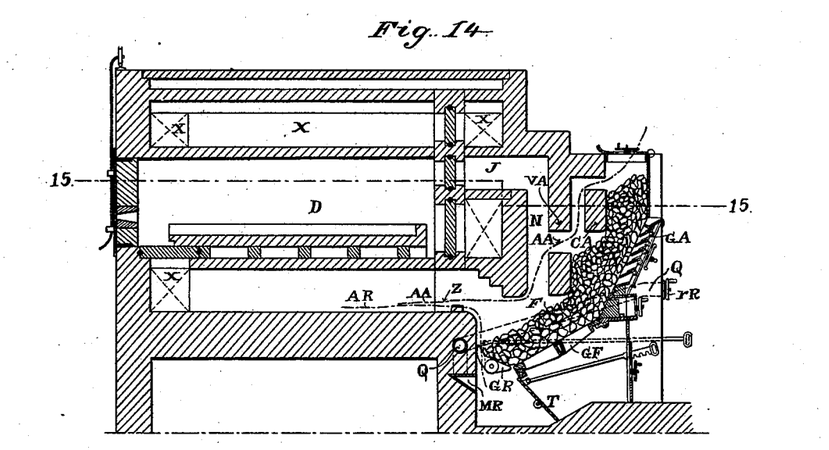
Fig. 14 is a vertical section of a crematory furnace.
Figure 15:
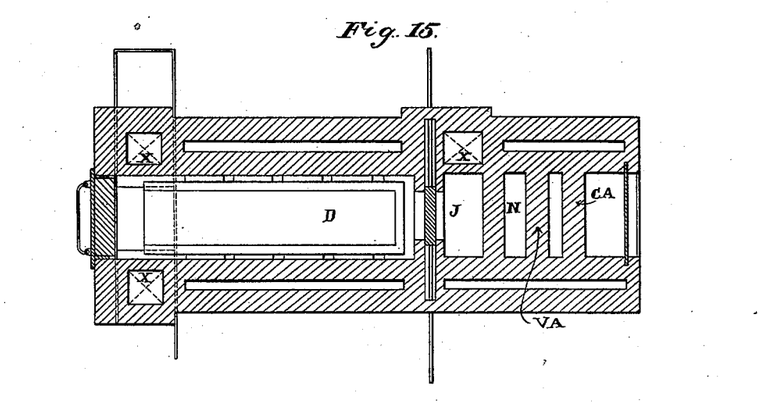
Fig. 15 is a horizontal section of the same on line 15—15 of Fig. 14.

In Fig. 14 the arch is shown divided into several portions VA and CA to allow the mingling of the combustible gases of the furnace with the gases from the cremation chamber D, which are drawn through the passages J and N to the point of combustion Z by the current AA. The admission of air beneath the rear grate GR is through an opening in the bridge MR communicating with the outside of the apparatus by a passage Q provided with the register rR at the end thereof.

X represents the flues through which the products of combustion circulate.

It will be obvious from the examples given that the principle of the invention may be applied in many different ways, the construction being suitably modified according to the particular use for which it is intended.

Having now particularly described my invention and various applications of the principles thereof, I declare that what I claim is—

1. In a heating apparatus provided with means for admitting a current of air above the fuel and another current beneath the same, the combination of a refractory arch in the line of the first current, a refractory fire-bridge in the line of the second current, the arch and fire-bridge being arranged as specified so that the two currents, inclosing the gases generated from the fuel, meet and effect final combustion at a point on one of said refractory elements, and a partition regulating the current of air admitted adjacent to the fire-bridge, substantially as described.

2. In a heating apparatus, the combination of an overhanging refractory arch provided with spaces or openings for passage of a current of air between it and the fuel, a refractory fire-bridge provided with means to admit a second current of air between it and the fuel, the surfaces of the two refractory elements being arranged as specified to direct said currents to a common point compressing the gases between them, and a partition for regulating the current of air admitted adjacent to the fire-bridge, substantially as described.

3. In a heating apparatus an overhanging arch of refractory material in close proximity to the surface of the fuel, said arch being provided with openings or passages for the currents of air and gas above the fuel from front to rear, substantially as described.

4. In a heating apparatus the combination of a corrugated arch of refractory material arranged above and in close proximity with the fuel; and metal strips forming protections therefor, substantially as described.

5. In a heating apparatus, a fire bridge of refractory material having corrugations forming channels for the passage of air above the fuel in combination with a refractory arch above the fuel and having air passages between it and the fuel, the currents of air passing through the corrugations of said fire-bridge being directed to a point of intersection with the second current, substantially as described.

6. In a heating apparatus, the combination with a grate adapted to burn solid fuel, of a refractory arch above the grate and a refractory fire-bridge, each having provision for admitting a current of air adjacent to it, one of said refractory elements having the configuration of a log and being located at the point of final combustion of the gases generated by the fuel burning on said grate, substantially as described.

In testimony whereof I have signed this specification in the presence of two subscribing witnesses.

JOSEPH HINSTIN.

Witnesses:
  GRÉVILLE,
  CH. NARCELOF.